J. P. HEIL.
POWER OPERATED SHEARS.
APPLICATION FILED JAN. 2, 1920.

1,351,569.

Patented Aug. 31, 1920.
2 SHEETS—SHEET 1.

INVENTOR,
J. P. Heil
BY
H. E. Dunlap
ATTORNEY.

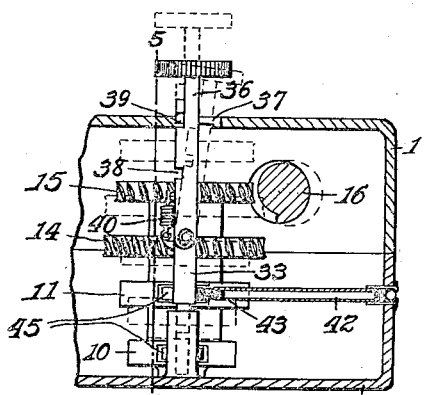
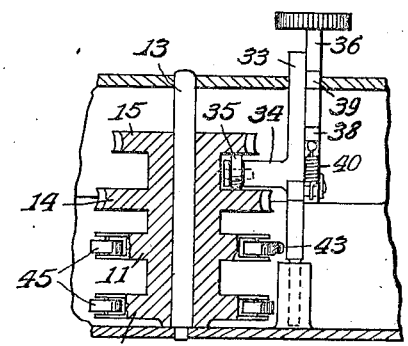
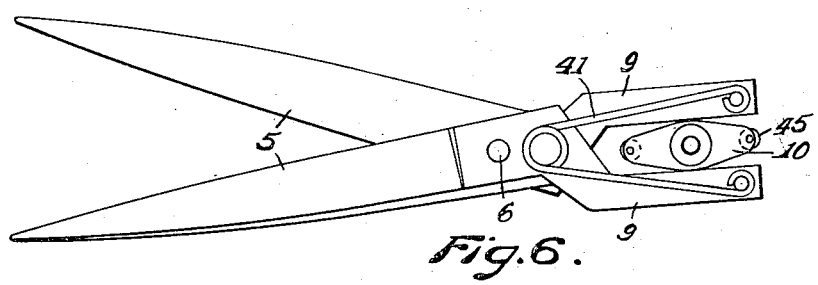
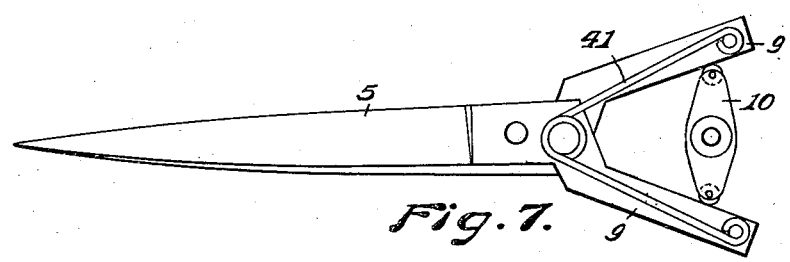
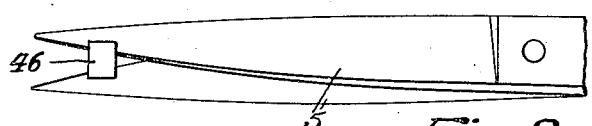

UNITED STATES PATENT OFFICE.

JESSE P. HEIL, OF WHEELING, WEST VIRGINIA.

POWER-OPERATED SHEARS.

1,351,569.

Specification of Letters Patent.

Patented Aug. 31, 1920.

Application filed January 2, 1920. Serial No. 348,826.

*To all whom it may concern:*

Be it known that I, JESSE P. HEIL, a citizen of the United States of America, and resident of Wheeling, county of Ohio, and State of West Virginia, have invented certain new and useful Improvements in Power-Operated Shears, of which the following is a specification.

This invention relates broadly to shears, and it has for its primary object to provide a shear mechanism in which the cutting blades are reciprocated mechanically.

A further object is to provide a shear mechanism embodying a flexible rotating power shaft adapted to be driven by an electric motor, suitable gearing whereby power from said shaft is communicated to the cutting blades for reciprocating the latter, and means whereby said gears may be instantaneously engaged and disengaged for starting and stopping the reciprocating movement of said blades.

A still further object is to provide a shear mechanism of the character mentioned having change-speed gearing whereby the speed of operation may be varied.

With these and other important objects in view, the invention resides in the features of construction, arrangement of parts and combinations of elements which will hereinafter be exemplified, reference being had to the accompanying drawings, in which—

Fig. 4 is a sectional elevation taken substantially on line 4—4, Fig. 1;

Fig. 5 is a partial section, enlarged, taken substantially on line 5—5, Fig. 4;

Fig. 6 is an elevation of the cutting blades disposed in normal position, and showing the position of the actuating cam when said blades occupy said position;

Fig. 7 is a similar view showing the cam in a position closing said blades; and—

Fig. 8 is an elevation showing the blades disposed in position for grinding.

Referring to said drawings, in which like designating characters distinguish like parts throughout the several views—

Figure 1:
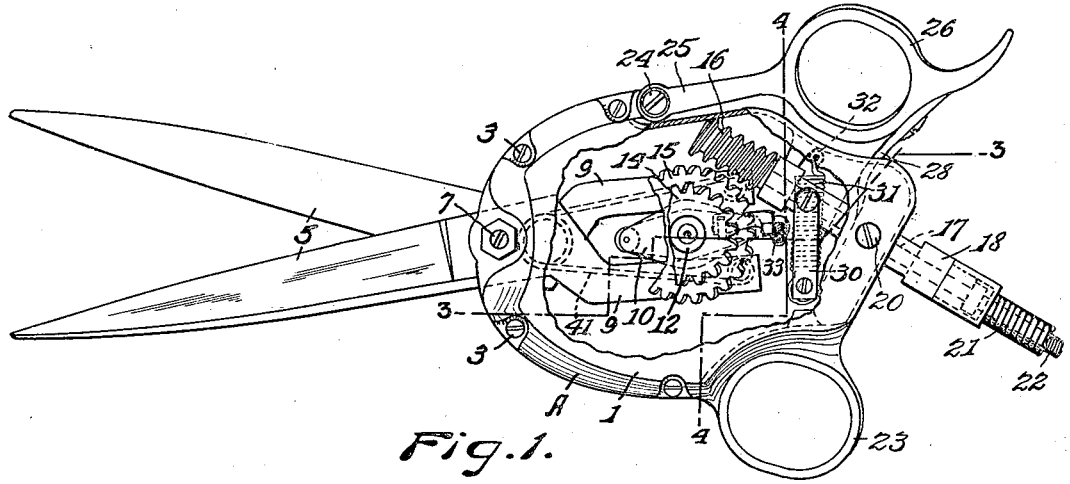
Figure 1 is a sectional elevation of the invention.
Figure 2:
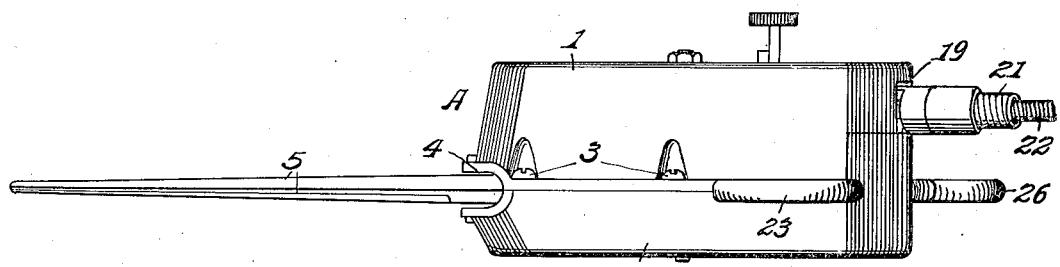
Fig. 2 is a side elevation.
Figure 3:
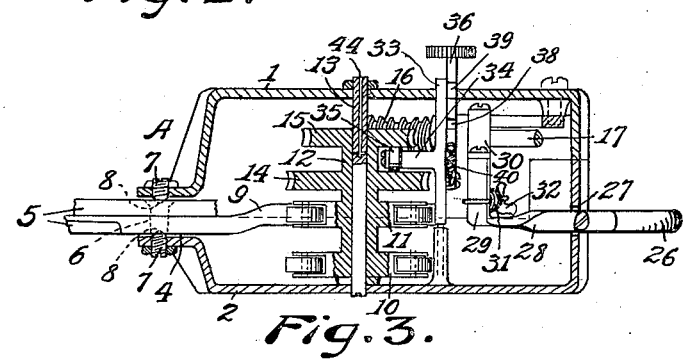
Fig. 3 is a section taken substantially on line 3—3, Fig. 1.

A indicates a casing composed of two or more interfitting and attached sections, two such sections designated 1 and 2 being herein shown, the same being attached by means of screws 3. Projecting outward through an opening 4 provided therefor in the front end of the casing are the cutting blades 5 of scissors or shears which are pivotally connected by a pivot pin or screw 6. Oppositely disposed screws 7 carried by the casing above and below the opening 4 have tapered pivot points seated in sockets 8 provided therefor in the opposite ends of the pivot screw 6, said screws 7 serving to maintain said blades in fixed pivoted relation to the front end of said casing.

Each blade 5 has an angularly disposed haft-like rear-end extension 9, and the inner, or confronting, edges of said extensions 9 lie approximately parallel when the blades occupy open positions, as shown in Figs. 1 and 6. Interposed between said confronting edges is one of a plurality of cams by means of which said blades are actuated to move from said open positions to the closed position shown in Fig. 7. While two cams, designated 10 and 11, are shown in the drawings, it will be understood that a single cam may be employed, or that a number of cams greater than two may be employed if desired. Said cams are fixed upon or formed integral with a sleeve 12 which is rotatably mounted upon a vertical shaft 13 which has its opposite ends mounted in a suitable manner, as in the opposite casing sections 1 and 2.

Also rigidly mounted upon, or formed integral with, the sleeve 12 is one or more worm gears, the number of which corresponds with the number of cams employed, two such gears, designated 14 and 15, being shown in the drawings. Disposed to be moved into and out of operative relation to one of said gears is a worm 16, the same being fixed upon the end of a stem 17 which is rotatable within a sleeve-like bearing 18. Said sleeve 18 has its rear end projected outward through a slot 19 provided therefor in the rear end of the casing and is pivotally mounted on said casing adjacent to said slot, as upon a pivot pin 20, so as to be capable of rocking or swinging movement in said slot; and detachably connected to the outer end of said sleeve is an end of a flexible tube 21 within which operates a flexible power transmission shaft 22 leading from a suitably located electric motor (not shown).

A stationary thumb-receiving ring 23 is carried by one side of the casing adjacent to the rear end of the latter, and pivotally connected to the opposite side of the casing, as at 24, is a stem 25 having an integral finger-receiving ring 26. Attached rigidly to said ring 26 and movable in and out through an opening 27 provided therefor in an adjacent portion of the casing is a bar 28 having an angularly disposed arm 29 at its inner end. Attached to the end of said arm 29 is one end of a transversely disposed link 30 which has its opposite end attached to the sleeve 18 adjacent to the inner end of the latter. A retractile coil spring 31 disposed approximately parallel to said link 30 has one end attached to said arm 29 and its opposite end attached to a stationary hook 32 or other similar fixed member carried by the casing. Said spring normally maintains the bar 28 in an outwardly thrust position, holding the ring 26 in its outwardly swung position, and, at the same time, acting through the link 30, maintains the sleeve 18 in a position wherein the worm 16 is held out of operative engagement with the adjacent worm gear.

The sleeve 12 is shiftable on the shaft 13, and the cams 10 and 11 and the gears 14 and 15 are so disposed relatively on said sleeve that gear 14 will occupy a position where it can be operatively engaged by the worm 16 when cam 10 is disposed between the extensions 9 of the blades 5, and that gear 15 will occupy a position where it can be operatively engaged by said worm when cam 11 is disposed between said extensions. Said gear 15 is of smaller diameter than said gear 14 and is consequently designed to be utilized for reciprocating the blades at a higher rate of speed than when said larger gear is operatively associated with the worm 16. And said cam 10 is of greater width than cam 11 so that when operatively associated with the blades, the latter are thereby permitted to open to a relatively less extent than when cam 11 is so associated with said blades. Thus, it will be obvious that, operated at high speed, a short reciprocating stroke of great rapidity results, while operated at low speed, a wide stroke of relatively less rapidity results.

To provide for shifting the gears with respect to the worm 16, a rod or bar 33, rectangular in cross section, is disposed parallel to the shaft 13, one end thereof being slidably mounted within a socket provided therefor in a bracket carried interiorly of the lower section 2 of the casing, and the opposite end thereof being projected outward through the top section 1. Said bar 33 carries a forwardly extending arm 34 having on its end an anti-friction roller 35 which is disposed between the gears 14 and 15, so that shifting movement of said bar in a longitudinal direction will draw said gears and the cams 10 and 11 upward or thrust said gears and cams downward, according as said bar is drawn outward or pressed inward. Pivoted to the rear face of said bar 33 is the inner end of a latch member 36 which normally lies in parallel alinement with said bar and which has its opposite end projecting outward through a transverse slot 37 provided in the top 1 of the casing. Said latch member has two notches 38 and 39 formed in a side thereof which are so located that, when the gear 14 lies in a position to coöperate with the worm 16, the notch 38 will receive therein and interlock with an adjacent portion of the casing at an end of the slot 37, and when gear 15 is located for coöperation with said worm, the notch 39 will interlock with said portion of the casing. A suitably located spring 40 normally maintains the latch member 36 in a position interlocking with the casing, as described, and permits said latch member to be rocked laterally in said slot 37 against the tension thereof when it is desired to disengage the latch member to permit the shifting of the gears and cams.

Anti-friction rollers are preferably carried by the opposite ends of the cams 10 and 11, as shown, for facilitating the movement of the same with respect to the extensions 9 of the blades 5.

A suitable spring, as the spring 41, serves to normally hold the blades 5 of the shears in the widest open position permitted by the width of the central part of the cam which is located in coöperating relation with said blades, and serves to instantly return said blades to open position following the closing thereof effected by rotation of said cams.

In practice, the shears remain inoperative with the continuously rotated worm 16 out of engagement with either gear until inwardly directed pressure is applied to the outer end of the stem 25 through the ring 26 for swinging said stem inwardly on its pivot 24. This action causes the worm to be depressed against the tension of spring 31 into engagement with one or the other of the gears 14 or 15, resulting in instantaneous actuation of the blades to rapidly reciprocate. Upon the release of the hand pressure applied through said ring 26, the spring 31 acts to instantly withdraw said worm from operative engagement with the gear.

The motor by which power is furnished through the flexible shaft 22 may be located in any appropriate position; for instance, when the shears are to be used by barbers for hair cutting, the motor may be supported upon a belt worn about the waist of the user and have a current conducting cord leading thereto from an overhead socket; or the motor may be carried upon an overhead rotary supporting arm.

Any suitable means may be employed for lubricating the various operating parts of the mechanism. As herein shown, an oiler tube 42 is provided, the same having a flexible oil applying pad 43 of felt or other suitable material projecting from its inner end in a position to wipingly engage the antifriction rollers 45 of the operating cam at each revolution. Additionally, the shaft 13 has an oil passage 44 leading to suitable side-opening ports through which oil is supplied for lubricating the sleeve 12.

It will be noted that the blades may be forced past each other to a considerable extent, as shown in Fig. 8, whereupon a block 46 of rubber or other material may be introduced between the separated points thereof for maintaining said blades in positions in which their edges may be conveniently ground or otherwise sharpened.

As is obvious, the shears may be applied to various uses and is susceptible to numerous changes or modifications in the form and arrangement of its parts without departing from the spirit or scope of the invention as defined in the appended claims.

What is claimed is—

1. Shears comprising pivoted relatively reciprocable cutting blades, a flexible rotary power-transmission shaft, a worm driven by said shaft, a gear wheel adapted to be driven by said worm, means for shifting said worm into and out of driving relation to said gear wheel, a cam driven through rotation of said gear wheel, and means interposed between said cam and said blades whereby rotation of the former actuates the latter to oscillate.

2. Shears comprising pivoted relatively reciprocable cutting blades, a flexible rotary power-transmission shaft, a worm driven by said shaft, a gear wheel adapted to be driven by said worm, means normally holding said worm out of driving relation to said gear wheel, means for shifting said worm into driving relation to said gear wheel, a cam driven through rotation of said gear wheel, and means interposed between said cam and said blades for producing relative oscillation of the latter.

3. Shears comprising pivoted relatively reciprocable cutting blades, a flexible rotary power-transmission shaft, a worm driven by said shaft, a gear wheel adapted to be driven by said worm, yieldable means normally maintaining said worm out of engagement with said gear wheel, means for shifting said worm into engagement with said gear, and a cam driven through rotation of said gear wheel, said cam being so disposed that rotation thereof produces reciprocation of said blades.

4. Shears comprising pivoted relatively reciprocable cutting blades, a flexible rotary power-transmission shaft, a worm driven by said shaft, a gear wheel adapted to be driven by said worm, yieldable means normally maintaining said worm out of engagement with said gear wheel, means for shifting said worm into engagement with said gear, and a cam driven through rotation of said gear wheel, said blades having portions engaged with said cam and adapted to be actuated by rotation of the latter to produce reciprocation of said blades.

5. Shears comprising pivoted relatively reciprocable cutting blades, a flexible rotary power transmission shaft, a worm driven by said shaft, a worm gear, means normally holding said worm out of engagement with said gear, means for shifting said worm into driving relation to said gear, a cam carried in fixed relation to said gear, and members carried by said blades arranged to be reciprocated by rotation of said cam for producing reciprocating movement of said blades.

6. Shears comprising pivoted relatively reciprocable cutting blades, a flexible rotary power transmission shaft, a worm driven by said shaft, a worm gear, means normally holding said worm out of engagement with said gear, means for shifting said worm into driving relation to said gear, a cam carried in fixed relation to said gear, members carried by said blades arranged at opposite sides of said cam and adapted to be actuated by rotation of the latter to move in opposite directions for producing reciprocation of said blades.

7. Shears comprising pivoted relatively reciprocable cutting blades, a flexible rotary power transmission shaft, a worm driven by said shaft, a worm gear, means normally holding said worm out of engagement with said gear, means for shifting said worm into driving relation to said gear, yieldable means normally maintaining said blades in open relation, and a cam rotatable with said gear disposed for actuating said blades to close against the tension of said yieldable means.

8. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a worm gear carried in fixed relation to said cam, a worm, means for driving said worm, means normally holding said worm out of engagement with said gear, and means for shifting said worm into engagement with said gear against the tension of its holding means.

9. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a power shaft, and change-speed gearing interposed between said shaft and said cam.

10. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a plurality of gears of different sizes disposed in fixed relation to said cam, a worm, means for driving said worm, means normally holding said worm in inoperative relation to said gears, means for shifting said gears to dispose any thereof in position to be engaged by said worm, and means for shifting said worm into operative engagement with the positioned gear.

11. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a plurality of gears of different sizes disposed in fixed relation to said cam, a worm, means for driving said worm, means normally holding said worm in inoperative relation to said gears, means for shifting said gears to dispose any thereof in position to be engaged by said worm, means for locking said gears in shifted position, and means for shifting said worm into operative engagement with the adjacent gear.

12. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a plurality of gears of different sizes disposed in fixed relation to said cam, a worm, means for driving said worm, means normally holding said worm in inoperative relation to said gears, means for shifting said gears to dispose any thereof in position to be engaged by said worm, means for locking said gears in shifted position, and pressure actuated means for moving said worm into operative engagement with the adjacent gear.

13. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a power transmission shaft, a worm driven by said shaft, a plurality of gears of different sizes associated with said cam for driving the latter, means normally holding said worm in inoperative relation to said gears, means for shifting said gears to dispose any thereof in position to be engaged by said worm, and means for shifting said worm into operative engagement with the adjacent gear.

14. Shears comprising a casing, pivoted relatively reciprocable cutting blades projecting outward from the interior of said casing, yieldable means normally maintaining said blades in open relation, rear end extensions carried by said blades interiorly of said casing, a rotatable cam interposed between said extensions and adapted through rotation to actuate said extensions to separate for closing said blades, a power transmission shaft, a worm driven by said shaft, a plurality of gears of different sizes associated with said cam for driving the latter, and means for shifting said gears to dispose any thereof in position to be driven by said worm.

In testimony whereof, I affix my signature in presence of two subscribing witnesses.

JESSE P. HEIL.

Witnesses:
H. E. DUNLAP,
THOS. J. RUDGE.